US011768880B1

(12) United States Patent
Nemani et al.

(10) Patent No.: US 11,768,880 B1
(45) Date of Patent: Sep. 26, 2023

(54) COMMUNITY-DRIVEN, CONTEXT-AWARE INTELLIGENT RESEARCH ASSISTANT SYSTEMS

(71) Applicant: United States of America as Represented by the Administrator of NASA, Washington, DC (US)

(72) Inventors: Ramakrishna Rao Nemani, Sunnyvale, CA (US); Jia Zhang, Sunnyvale, CA (US); Tseng-Dar John Lee, Burke, VA (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 311 days.

(21) Appl. No.: 16/712,982

(22) Filed: Dec. 12, 2019

Related U.S. Application Data

(60) Provisional application No. 62/778,621, filed on Dec. 12, 2018.

(51) Int. Cl.
| | | |
|---|---|---|
| *G06F 16/00* | (2019.01) | |
| *G06F 16/9038* | (2019.01) | |
| *G06F 9/54* | (2006.01) | |
| *G06F 9/451* | (2018.01) | |
| *G06F 16/2457* | (2019.01) | |

(52) U.S. Cl.
CPC ......... *G06F 16/9038* (2019.01); *G06F 9/453* (2018.02); *G06F 9/547* (2013.01); *G06F 16/24575* (2019.01)

(58) Field of Classification Search
CPC ................................. G06F 16/24575
See application file for complete search history.

(56) References Cited

U.S. PATENT DOCUMENTS

2015/0169336 A1* 6/2015 Harper .................. G10L 15/22
715/706
2019/0108830 A1* 4/2019 Pollet ..................... G10L 13/08

* cited by examiner

*Primary Examiner* — Ajith Jacob
(74) *Attorney, Agent, or Firm* — Rhys W. Cheung; Robert M. Padilla; Trenton J. Roche

(57) ABSTRACT

Community-driven, context-aware (e.g., geospatially and space-time aware) intelligent research assistant systems are provided. A virtual assistant application of a user computing system may receive a query from a user and provide the query to a server. The server may determine a category and topic of the query and determine whether an application exists for the category and topic. When the application exists, the server may call an application programming interface (API) associated with the application that executes finite state machine (FSM) logic to determine a context-aware answer to the query and provide the determined context-aware answer to the virtual assistant application.

18 Claims, 5 Drawing Sheets

COMMUNITY-DRIVEN, CONTEXT-AWARE INTELLIGENT RESEARCH ASSISTANT SYSTEMS

CROSS-REFERENCE TO RELATED APPLICATION

This application claims the benefit of U.S. Provisional Patent Application No. 62/778,621 filed Dec. 12, 2018. The subject matter of this earlier filed application is hereby incorporated by reference in its entirety.

ORIGIN OF THE INVENTION

The invention described herein was made by employees of the United States Government and may be manufactured and used by or for the Government of the United States of America for governmental purposes without the payment of any royalties thereon or therefore.

FIELD

The present invention generally pertains to intelligent systems, and more particularly, to community-driven, context-aware intelligent research assistant systems.

BACKGROUND

Over the past four decades, NASA has produced hundreds of terabytes of Earth science data from a variety of sensors on land, in the sea, and in the atmosphere. The data is publicly available on web portals and in searchable catalogs. However, the datasets are not designed for exploration and interaction by non-experts, and it is difficult for such individuals to find the information they are seeking.

Virtual digital assistants (e.g., Siri®, Google Assistant®, Cortana®, Alexa®, etc.) have been developed to attempt to tailor the functionality of electronic devices (e.g., personal computers and mobile phones) to the daily lives of users. These virtual assistants allow users to speak requests to computers or mobile phones, which then perform speech-to-text recognition and execute web searches based on the content of the user's request. This functionality is typically executed by backend servers provided by the company (e.g., search engine functionality). Various industries and companies are also increasingly focused on extracting insights from big datasets. Many industries could profit from techniques to more readily extract data and insights from big data, and to present them in a more readily understandable form.

However, current systems cannot provide answers that are geospatially and space-time aware. For example, if a user asks Siri® what the weather was like in San Francisco three days ago, Siri® could not find this answer. Also, typical virtual assistants only allow community users to indirectly influence system behavior through their queries. For example, if many users ask the same or similar questions and prefer the same answer, the answer will be more likely to be provided to future users. This is somewhat analogous to how Google's search engine ranks websites and search paths using ranking algorithms.

One unique feature of a scientific question is that it should be handled by dedicated scientific procedures developed by domain experts. For example, in order to precisely locate the wildfires burning in California in real-time, a sophisticated procedure (i.e., a workflow) should be executed to analyze images streaming from satellites. In other words, the ability to answer a research question depends on whether the corresponding software procedure is offered by community experts.

In addition, science is constantly evolving. New research questions can be answered as new experiments and capabilities are developed. Meanwhile, existing procedures may be enhanced by researchers. Thus, companies providing existing personal digital assistants cannot be relied on to code scientific procedures into systems that are scalable and extensible. Research communities should be considered as the main source for providing such answers. Furthermore, users often may not know what scientific algorithms or procedures are already available. Thus, such users may "reinvent the wheel" by creating their own procedures, which wastes community resources that could be applied to new problems. Moreover, users may not be able to provide typed input to computing systems under certain circumstances. For example, when a geoscientist is working in the field or when an astronaut is exploring on Mars, such a user likely cannot readily type input into their computing systems. Such users may thus prefer or require voice-driven assistance.

Accordingly, an improved approach that continuously integrates community intelligence, provides personalized research assistance in a conversational manner, and is geospatially and space-time aware, may be beneficial.

SUMMARY

Certain embodiments of the present invention may provide solutions to the problems and needs in the art that have not yet been fully identified, appreciated, or solved by conventional digital assistant systems. For example, some embodiments of the present invention pertain to community-driven, context-aware (e.g., geospatially and space-time aware) intelligent research assistant systems. In some embodiments, a community-driven research assistant system allows a community user to contribute and add specific capabilities to the system. The user may register a new capability with the system, which may include multiple applications. Each application, is in turn, may be registered with the system, which may be a RESTful ("representational state transfer") application programming interface (API), the code of which may run on the user's own server and may be invoked by the research assistant system through Hyptertext Transfer Protocol (HTTP) calls, for example. The user may also specify which question(s) that each application can answer, as well as provide a template to provide the answer. The user may also specify dependencies among the included questions supported by corresponding applications. For example, the user may specify that a question for predicting a trend for a fire (e.g., direction of spread, whether increasing or decreasing in size, etc.) may be asked only after a question of checking whether a fire exists at a location is asked.

In some embodiments, a community-driven, context-aware intelligent research assistant system includes a user computing system running a virtual assistant application and a server. The virtual assistant application is configured to receive a query from a user of the computing system, transmit the query to the server, receive a response from the server, and display information pertaining to the response to the user. The server is configured to receive the query from the virtual assistant application, determine a category and topic of the query, and determine whether an application exists for the category and topic. When the application exists, the server is configured to call an API associated with the application that executes finite state machine (FSM) logic to determine a context-aware answer to the query and provide the determined context-aware answer to the virtual assistant application.

In another embodiment, a computer program is embodied on a nontransitory computer-readable medium. The program is configured to cause at least one processor to receive a query from a virtual assistant application of a user computing system, determine a category and topic of the query, and determine whether an application exists for the category and topic. When the application exists, the program is also configured to cause the at least one processor to call an API associated with the application that executes FSM logic to determine a context-aware answer to the query and provide the determined context-aware answer to the virtual assistant application.

In yet another embodiment, a computer-implemented method includes receiving, by a computing system, a query from a virtual assistant application, determining, by the computing system, a category and topic of the query, and determining, by the computing system, whether an application exists for the category and topic. When the application exists, the computer-implemented method also includes appending a prefix to words of the query, by the computing system, to provide a unique namespace delimiting context of the query, calling, by the computing system, an API associated with the application that executes FSM logic to determine a context-aware answer to the query, and providing, the determined context-aware answer to the virtual assistant application, by the computing system. The FSM includes a gateway node and at least one question node. The gateway node is related to the application. The at least one question node is related to a question addressed by the application and includes a developer-defined syntactical format comprising a plurality of components for the question and an answer template for the question.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
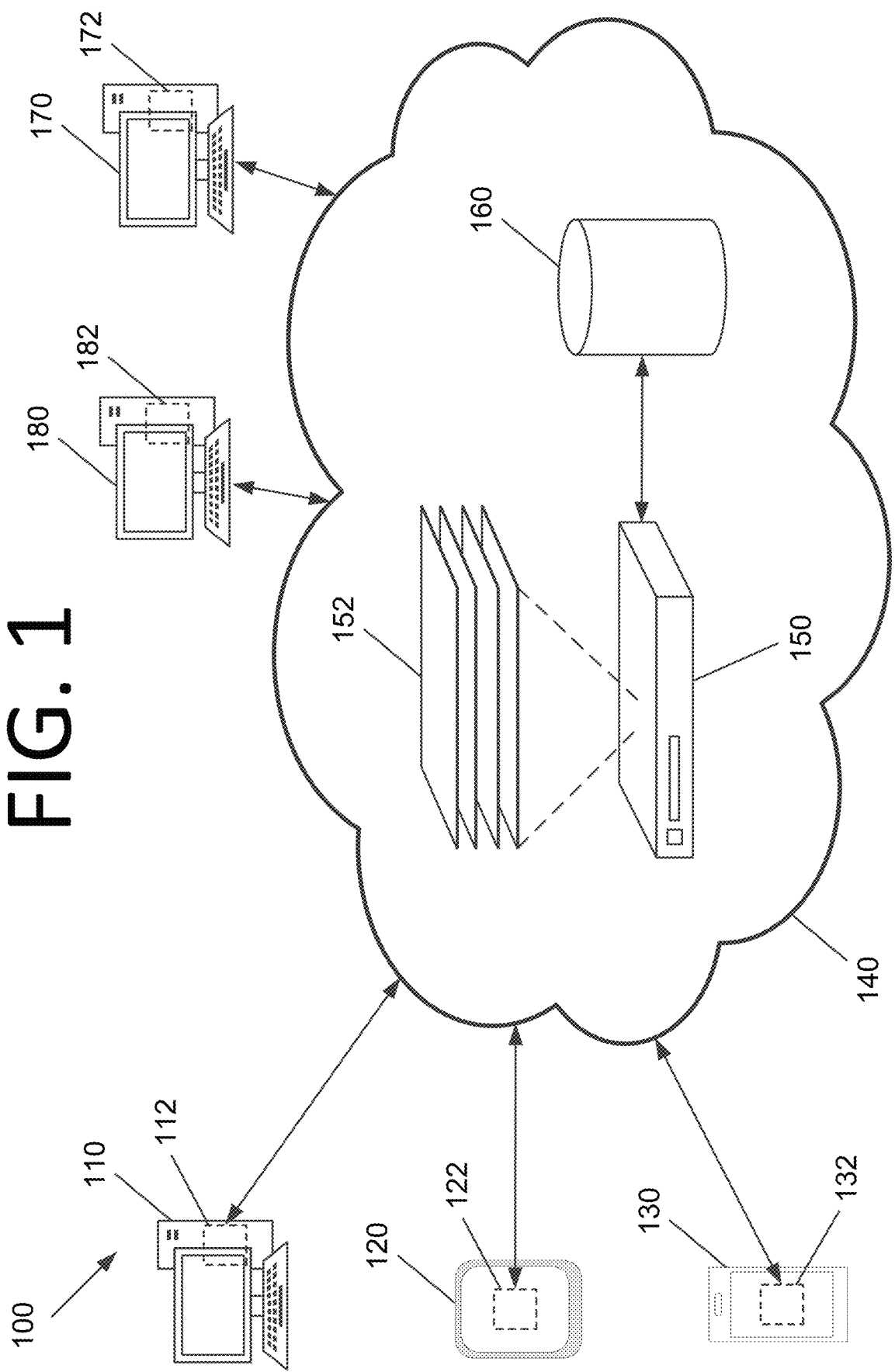
FIG. 1 is an architectural diagram illustrating a context-aware intelligent research assistant system, according to some embodiments of the present invention.

Some embodiments of the present invention pertain to community-driven, context-aware (e.g., geospatially and space-time aware) intelligent research assistant systems. Such systems may provide a novel way of communicating with users (e.g., a scientific community) and receiving community support. Such embodiments may be applied to research in scientific communities, companies, non-expert communities of interested individuals, or any other suitable application without deviating from the scope of the invention.

The system of some embodiments includes an application registration module, a state transition management module, an application evaluation module, a user profile learning module, a system monitoring/learning module, and a recommendation module. The application registration module may allow community members to register the applications they have developed with the system together with the questions supported by the application and their interdependencies, as well as state transition relationships. The state transition management module may manage user navigations from one state to another using these state transition relationships. The application evaluation module may evaluate and ensure security of registered applications. The user profile learning module may learn the profile of past questions by the community member to provide more personalized assistance. The system monitoring/learning module may learn chainable modules by monitoring and learning from the provenance (i.e., past history) of user queries, answer exploration, and feedback. Chainable modules refer to applications that may be registered by different developers (i.e., providers) and may be chained together based on their semantic purposes to answer a user query. By way of nonlimiting example, an application for returning fire locations may be chained with another application for pinning locations on maps to provide enhanced solutions. The recommendation module may then use this information to provide recommendations.

Some embodiments may be implemented as a call center-like system, where users are guided to navigate through questions supported by the system that are organized in a hierarchical manner. In certain embodiments, such a hierarchy of the supported questions may be defined and managed by community application developers. In the case of a scientific community, these application developers may be experts in the field (e.g., Earth science).

The intelligent research assistant system of some embodiments is highly scalable in that the growth of its capacity is driven, managed, and enhanced by community users. Per the above, application developers may register applications with the system, along with the questions supported by the application and their interdependencies, as well as state transition relationships. Application developers may also define external software services that can support the questions via calls to application programming interfaces (APIs), for example.

In the Earth science domain, an intelligent research system called MATA has been developed that is able to run on a personal computer or a mobile phone that facilitates user interaction with the system and assists the user in more effectively engaging with remote services. MATA is the Sanskrit name for the Earth, as well as the name of a goddess in Hinduism and some branches of Buddhism. MATA is designed to utilize geospatial data to pull stored data from dozens of satellites related to hurricanes, floods, dust storms, heat waves, cold waves, power outages, forest fires, etc. When a user has a question pertaining to Earth science data, MATA allows the user to pose the question to the tool, which then finds the answer by pulling the appropriate data and conducting additional computations as needed. The answer is then provided to the user conversationally. While NASA makes Earth science data available via the web, MATA provides a conversational assistant and associated computing to turn this data into usable knowledge. This system engages with users in an integrated, conversational manner using natural language dialogue and invokes external web services when appropriate to obtain information and/or perform various actions on a variety of satellite and geospatial data to provide spatio-temporally aware answers.

As a nonlimiting example, consider the case where a user is driving and sees smoke. The user may ask MATA, "Is there a fire ahead?" MATA may then answer that, "A fire exists 5 miles east of your current location and extends from Escondido southwest to Del Dios. There is one fire. The winds are currently from the west and are gusting at speeds of up to 50 miles per hour. The fire is expected to spread east at approximately two miles per hour. The fire currently poses no danger to your current location."

FIG. 1 is an architectural diagram illustrating a context-aware intelligent research assistant system 100, according to some embodiments of the present invention. System 100 can include any desired user computing system, such as desktop computer 110, tablet 120, and smart phone 130. However, any desired computing system may be used without deviating from the scope of invention including, but not limited to, smart watches, laptop computers, Internet-of-Things (IoT) devices, vehicle computing systems, listening devices with microphones (e.g., Amazon's Alexa®), etc.

Each computing system 110, 120, 130 has a respective virtual assistant application 112, 122, 132 that is configured to receive voice and/or text queries from the user and interface with a server 150 via a network 140 (e.g., a local area network (LAN), a mobile communications network, a satellite communications network, the Internet, any combination thereof, etc.) to obtain answers. For example, after translated by the respective virtual assistant application 112, 122, 132, server 150 may receive the natural language query in the example above, "Is there a fire ahead?" It should be noted that multiple servers 150 and/or databases 160 may be used to process the user queries and provide context-aware functionality without deviating from the scope of the invention, potentially in different physical locations (e.g., via a cloud-based system).

Server 150 runs various modules and applications 152, such as an application registration module, a state transition management module, an application evaluation module, a user profile learning module, a system monitoring/learning module, a recommendation module, community-developed applications, etc. These modules and applications 152 facilitate the context-aware research assistant search functionality for the user, querying and processing data stored in database 160 via an appropriate application 152 (which is accessed by an application programming interface (API) in some embodiments). After running the appropriate modules 152, server 150 then returns the answer to the virtual assistant application 112, 122, 132 that made the query. More specifically, the appropriate module of modules 152 may select and invoke proper APIs (potentially in the proper order) to answer the user queries and transmit a response to the virtual assistant application. The user may then use this information to complete a task.

In certain embodiments, virtual assistant application 112, 122, 132 may wait a predetermined period of time before providing an audio answer to the user. If the user does not cancel the query within the predetermined period of time, virtual assistant application 112, 122, 132 may cause the respective computing system 110, 120, 130 to generate audio characterizing the responsive action to the user. If the user cancels the query within the predetermined period of time, virtual assistant application 112, 122, 132 may halt the responsive action and transmit a new query to server 150, if provided by the user.

Community experts may develop software applications 152 to be run on server 150 or called by server 150 through an API to a developer computing system 170 on the developer side running a developer application 172. In this manner, additional and/or improved functionality may be provided by a community of domain experts, whereas users of computing systems 110, 120, 130 may not have such expertise. Such experts may develop procedures to analyze satellite images, for example.

This community-based approach differs from conventional voice-based virtual assistant systems, which rely on system software developers to program the logic for the questions that the system can answer. For example, a car-equipped assistant is programmed to answer driving-related questions and a home assistant is programmed to answer questions users tend to ask regarding their daily lives. In contrast, some embodiments of the present invention allow a community of application developers with expertise in various subjects to register software with the system to expand its capabilities. Application developers can thus submit new applications to the system, together with related questions that can be answered by the application. In this way, the system incrementally becomes more powerful and capable through the efforts of a community of researchers and experts.

In certain embodiments, system administrators may review submitted application proposals and decide whether such applications should be selected to be supported by the system via an administrator application 182 running on an administrator computing system 180. Administrators may also perform various other administrative functions via administrator application 182. For example, in some embodiments, administrators may monitor the performance of registered applications and provide recommendations. In certain embodiments, administrators may register software with the system together with supporting questions.

In certain embodiments, a user profile may be generated over time based on his or her research interests and the questions the user has asked. More specifically, such information may be maintained in some embodiments throughout the user's interactions so the recommendation module of the integrated system can learn to provide personalized assistance. By way of nonlimiting example, the system may record datasets that a user queried together with the timestamps of the requests. If a user is statistically found to query wildfire datasets intensively during a particular time period, the recommendation module may proactively recommend a new wildfire dataset to the user when it becomes available due to a newly launched NASA satellite, for example.

Figure 2:
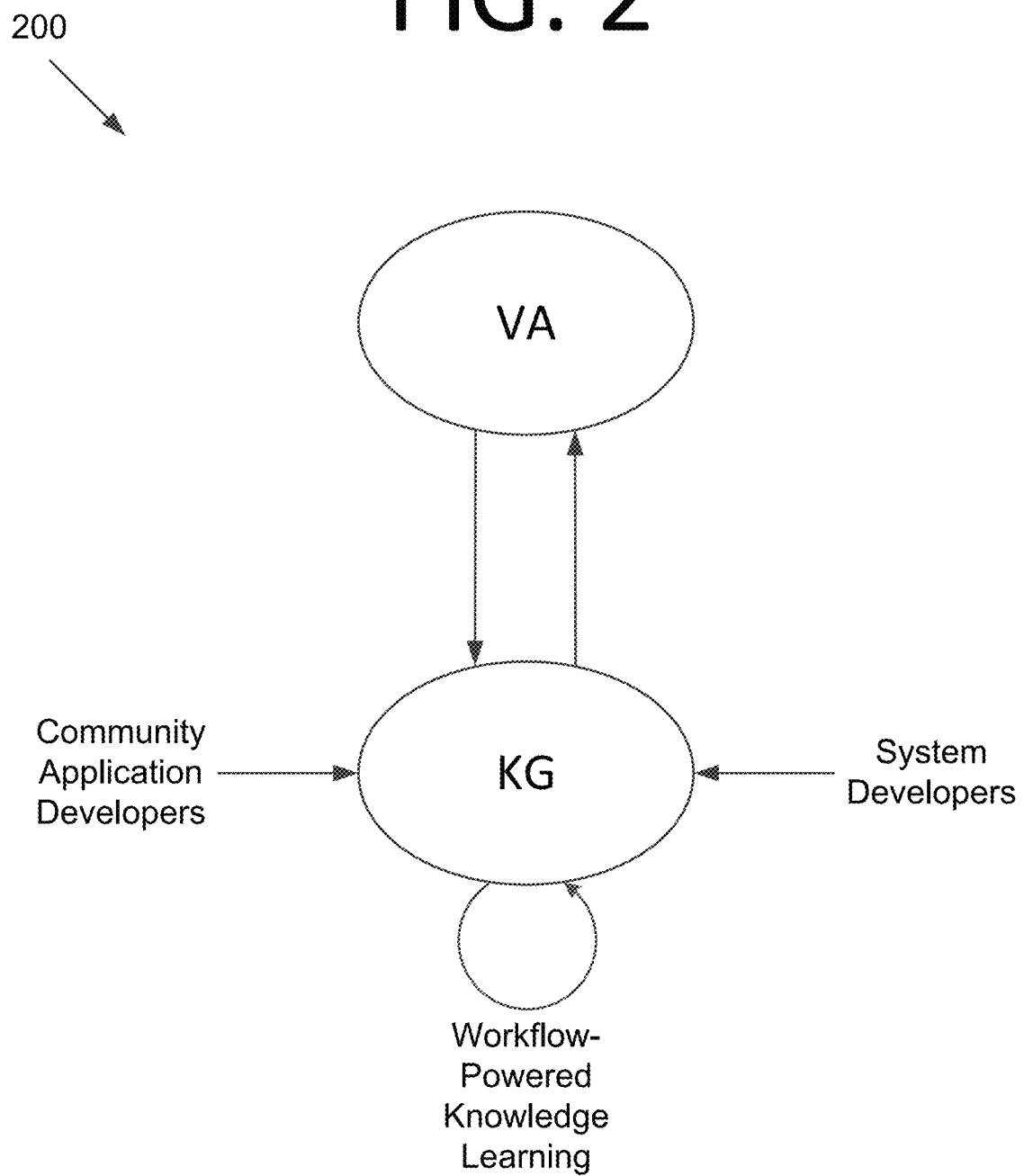
FIG. 2 is a knowledge graph supporting an intelligent research assistant system, according to some embodiments of the present invention.

FIG. 2 is a knowledge graph 200 supporting an intelligent research assistant system, according to some embodiments of the present invention. The intelligent research system may be implemented to be enriched by community application developers in addition to system developers, instead of being enriched by system developers alone, as is the case with typical virtual assistants. In some embodiments, the intelligent research assistant may be equipped with workflow-powered knowledge learning in addition to learning from user questions and answers from user input. For example, consider the case where one past question (Question #1) takes a location and time period as input and responds with a collection of locations where fires occurred through a specific API invocation, and another past question (Question #2) takes a collection of addresses and pins them onto a map through a specific API invocation. The two questions may be recorded in a knowledge graph, which may find that these two API invocations can be chained to answer the query: given a location and time period, pin all fires that occurred on a map. Here, such knowledge may be learned by detecting the that the data type of the output from Question #1 is semantically equivalent to that of the input to Question #2.

As with most software systems, security should be considered. In order to mitigate the risk of community-developed applications containing malicious code that can infect the system, container technology may be used. Various commercial and open-source tools exist for evaluating and ensuring container-oriented security (e.g., Docker®).

Some embodiments may be implemented in a manner such that knowledge graph 200 becomes scalable and extensible as the community evolves. Knowledge graph 200 may store all questions that can be supported by the system, together with how each question may be answered through calling expert-provided applications via APIs (e.g., web APIs), as well as dependencies among supported questions specified by application developers or learned by the recommendation module of the system.

In some embodiments, the questions that the system can handle may be organized by categories and topics. For example, assume the intelligent research assistant system can answer questions about fire detection and climate analytics. The intelligent research assistant system may thus prompt users to choose between fire services and climate services.

Figure 3:
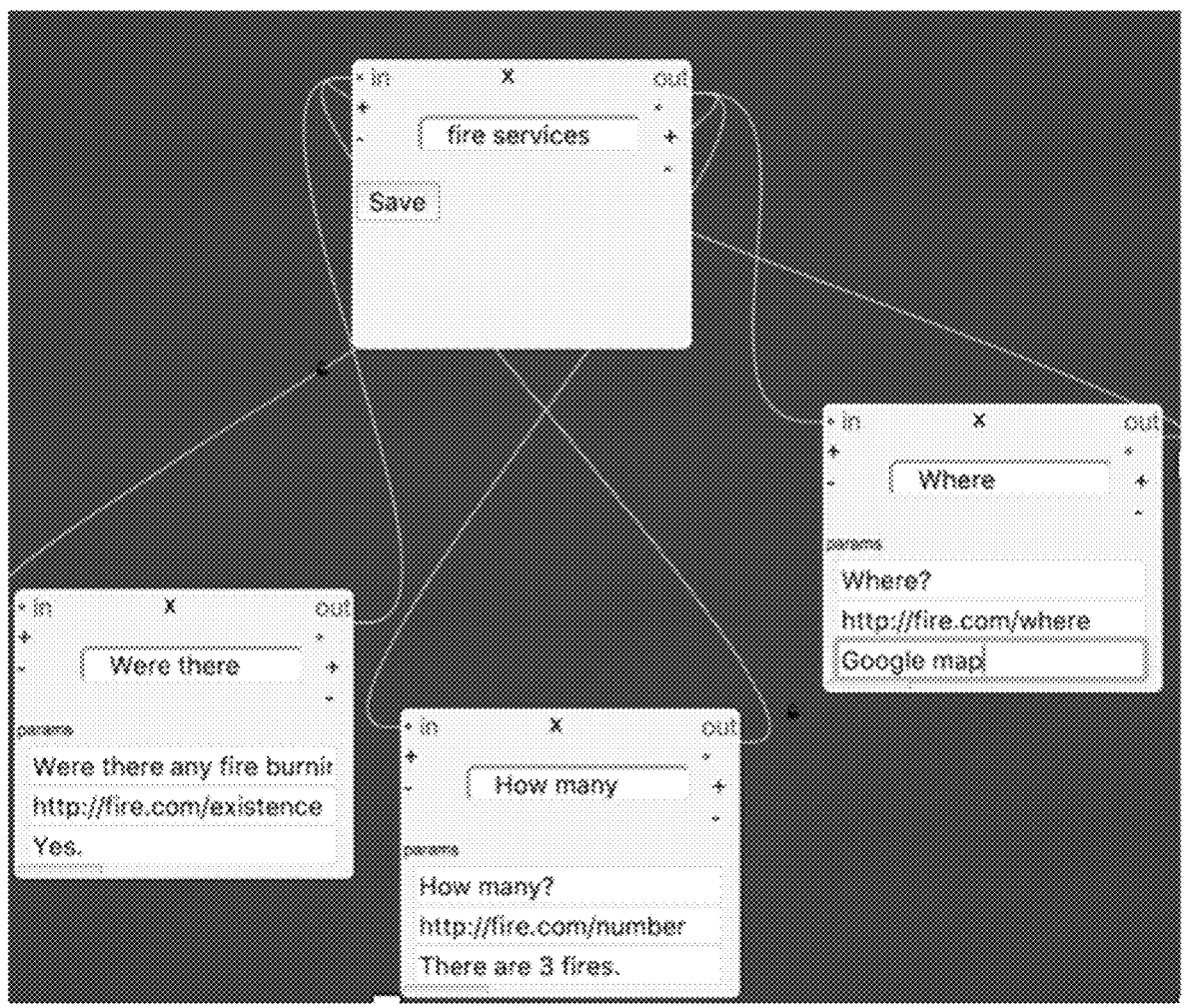
FIG. 3 is a screenshot illustrating a state transition diagram edited by an application developer, according to some embodiments of the present invention.

FIG. 3 is a screenshot illustrating a state transition diagram 300 edited by an application developer, according to some embodiments of the present invention. In FIG. 3, if users select to ask fire questions, the intelligent research assistant system will inform users that three types of questions can be answered: (1) checking whether fires exist at a location at some given time frame; and if yes, (2) how many of fires; and (3) where are the fires located. If a user asks the first query and receives a positive answer, he or she may ask a subsequent query, such as "how many." Based on the context of previous dialogue, some embodiments may be intelligent enough to refine the user question of "how many" by adding one or more location and date ranges. In this way, some embodiments of the present invention can make the digital research assistant context-aware for a scientist or other interested individual.

Certain embodiments may be implemented as a finite state machine (FSM). Users may decide to choose from provided menu options to navigate the system and may return to a higher-level menu at any time in some embodiments. Such user navigations may be managed by state transitions. For example, referring to FIG. 3, each question in the scope of an application is represented by an individual state, and the gateway question "fire services" is represented by another state. After users reach the fire services menu item, they can transfer to three states (i.e., "Were there," "How many," and "Where") by asking those questions. The system may then return to the fire services state after each question is answered.

In FIG. 3, there are two types of defined states: gateway states and question states. A question state refers to a specific question that an application can support. For example, the fire services application here can support a question state "Where," which allows users to check the location of fires during desired time periods. A gateway state refers to a specific application that can be supported by the system. For example, fire services is itself an application, and thus becomes a gateway state. In FIG. 3, the gateway state "fire services" contains multiple question states underneath.

In some embodiments, community users may directly participate in and influence the system behavior by informing the system which queries can be supported by providing application APIs. Referring to FIG. 3, for example, in this embodiment, fire services providers can explicitly teach the intelligent research assistant system which types of questions can be supported and provide application APIs to support each of the questions.

For each question state, application developers may choose the syntactical format of the question. For instance, using the example of FIG. 3, in order for users to query the location of fires during one or more time periods, the application developer may require that the proposed question follow the following format including several key components:

[How many] (fires) [time period(s)] [location(s)]?

In certain embodiments, such a question must contain the keyword phrase "how many" followed by the time period(s) and location information. The term "fires" may be optional due to the context of the question. For example, due to the context, if the user already provided time and location information in an earlier conversation (e.g., "Were there fires burning today in California?"), the system may be able to automatically fill in the requisite components. In some embodiments, the format of this question is thus defined by the application developer and not by system developers.

In some embodiments, one or more APIs may be called to solve each question. This may be defined by application developers in addition to the questions. For example, in some embodiments, the application developer informs the system which API(s) will be invoked to answer questions when asked by users. In certain embodiments, application developers may decide to enhance and update the implementation of the corresponding API, potentially so long as the interface of the API remains unchanged. In this manner, the system may evolve through community support without being limited to programming by system developers.

In some embodiments, application developers may choose an answer template for each question. For example, application developers may provide the system with the following answer template for the above question:

There are _____ fires.

Upon receiving such a question, the system may invoke the associated API to obtain the number of fires that occurred during the desired time period in the desired location and provide a response to the user by inserting the number into the above answer template.

Some embodiments allow community application developers to contribute comprehensive applications rooted by possible gateway states, which may include possible states underneath each application (i.e., gateway state). Application developers may provide a gateway state and possible states underneath the gateway state (see, e.g., FIG. 3). A system administrator (potentially a subject matter expert) may review the submitted comprehensive applications rooted by gateway states and decide whether to include the applications in the system. In this manner, the applications are provided by the community, but are subject to review to attempt to ensure that the applications are useful and safe.

In some embodiments, community application developers may decide state transitions among questions. Referring to FIG. 3, for example, the fire services application developers may decide that after each question, the state will transition to the gateway state. This means that from the gateway state, users can ask any of the three supported questions. Questions do not need to be asked in a specific order (e.g., "How many" only being asked after "Where"), but rather, all three questions can be asked independently.

In some embodiments, a browser-based design tool may be provided that implements a look-and-feel similar to FIG. 3 (e.g., via JavaScript). For instance, users may choose gateway states and question states, input their parameters, and create logical links therebetween to create an FSM-type structure. This may help to facilitate more straightforward and commonly adopted community-driven state transition design, development, and maintenance.

In the example of FIG. 3, each state is implemented in the form of two types of nodes: state and question. Each node in this embodiment includes one or more input ports and output "ports." Nodes are connected to one another through their input ports and output ports. Application developers can use this tool to readily design and describe the state transition diagram online using drag-and-drop functionality in some embodiments.

Consider the fire services application as an example. Referring to FIG. 3, the application developer can drag an instance of a state node (i.e., a gateway node), configure the node to be "fire services," and save the configuration. In certain embodiments, this is a special gateway state. Afterwards, application developers can drag an instance of a question node and configure the node to be a "were there" question. The developer can then configure the question node and define its question template, the API used, and the answer template. The developer can click the input port of the question node and then click on the output port of the "fire services" state node. An edge will be generated between the two nodes showing that users can ask this question after reaching the state node. The application developer can click the output port of the question node and hold on to click the input port of the state node. Another edge will be generated between the two nodes, showing that after the question is answered, the state will transition back to the gateway state so that users can ask the same question again or a new question. Application developers can continue to create and configure the other question nodes and define their state transition relationships. In the example of FIG. 3, the three question nodes are independent from one another, and their output ports are all connected to the input port of the gateway state.

It should be noted that each node may have more than one input port and one output port in some embodiments. Referring to FIG. 3, a developer can click the "+" in a node to add more input ports and output ports as desired. In addition, the state node and question nodes alternate. If two question nodes are defined to have a dependency relationship therebetween, a state node should be inserted between them. In this way, Petri net technology can be applied to automatically validate the state transition design.

Some embodiments can resolve name conflict issues. For example, in the context of the fire services application, the term "fire" may be defined as an application-related keyword. In other applications, however, the term "fire" may not be considered as a keyword. Thus, if a user accidently mentions the term "fire" in other applications, the system may not understand the term. To address this concern, "name spaces" may be used to delimitate the context of a conversation under particular applications. Using the fire services application again as an example, after a user enters the scope of the "fire services" state, the terms that he or she speaks may be automatically appended with a prefix representing the gateway state "fs:". For instance, if the user asks:

Were there any fires burning today in California?

the system may automatically convert the sentence into the format:

fs:Were fs:there fs:any fs:fires fs:burning fs:today fs:in fs:California?

In this way, terms under different contexts will be recognized as different terms that will not cause conflict with one another.

Figure 4:
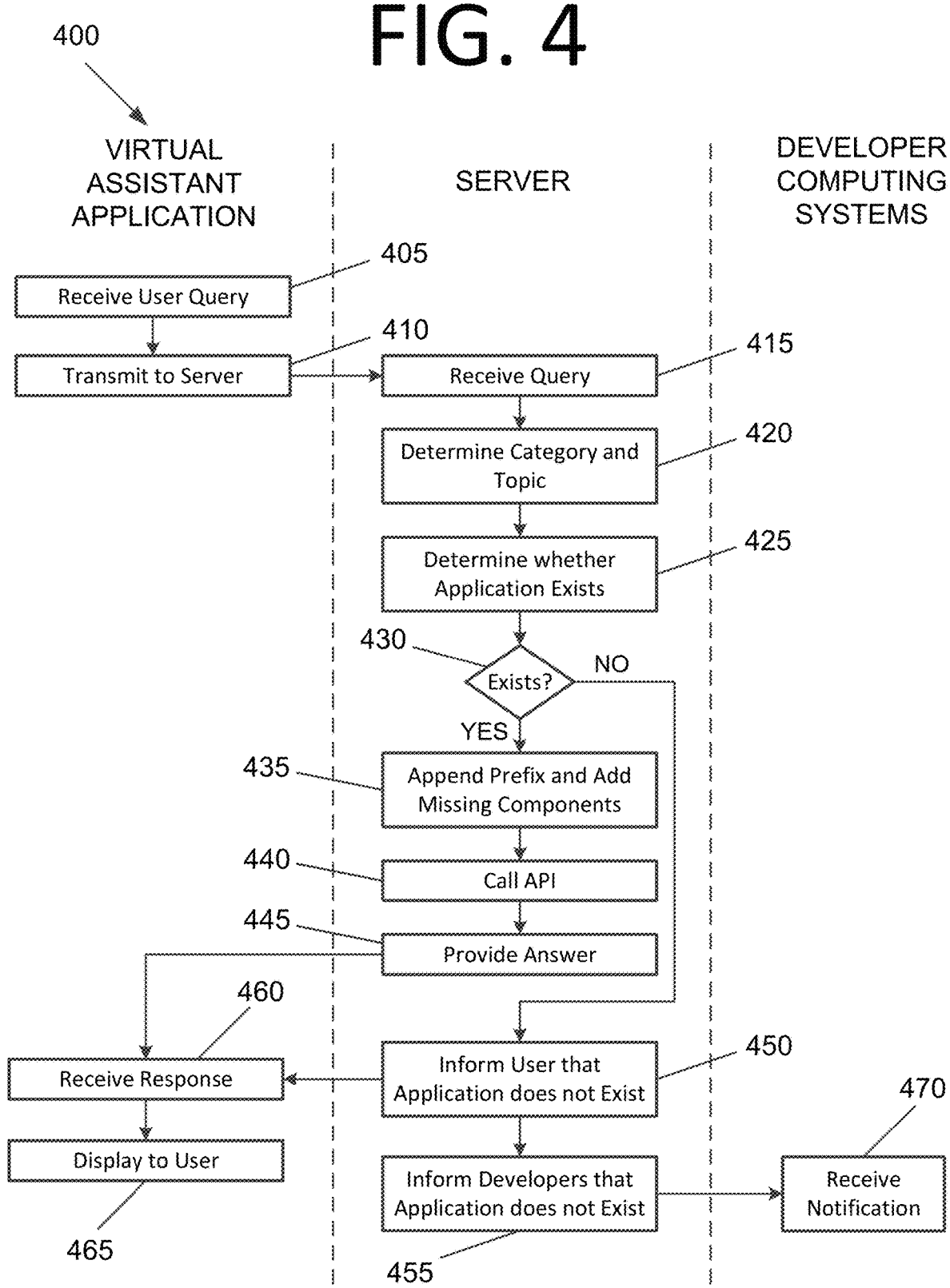
FIG. 4 is a flowchart illustrating a process for a context-aware intelligent research assistant system, according to some embodiments of the present invention.

FIG. 4 is a flowchart illustrating a process 400 for a context-aware intelligent research assistant system, according to some embodiments of the present invention. The process begins with a virtual assistant application receiving a query from a user at 405. In some embodiments, the query may be a spoken natural language query and may be converted to text by a speech-to-text engine. In certain embodiments, the text of the query may be entered manually by the user. The virtual assistant application then transmits the query to a server at 410.

The server receives the query from the virtual assistant application at 415, determines a category and topic of the query from the query text at 420, and determines whether an application exists for the category and topic at 425. The applications may be from an extensible pool of applications developed by domain experts. When the application exists at 430, the server appends a prefix to words of the query at 435 to provide a unique namespace delimiting context of the query, and if needed, automatically adds one or more missing components for the question based on earlier queries by the user, e.g., the time and location of the fires. The server also calls an API associated with the application that executes FSM logic at 440 to determine a context-aware answer to the query and provides the determined context-aware answer to the virtual assistant application at 445.

In some embodiments, the execution of the FSM logic includes analyzing geospatial and temporal information. In certain embodiments, the FSM includes a gateway node and at least one question node, where the gateway node is related to the application and the at least one question node is related to a respective question addressed by the application. In some embodiments each question node includes a developer-defined syntactical format comprising a plurality of components for the question. In certain embodiments, the at least one question node includes an answer template for the respective question. In some embodiments, the gateway node and the at least one question node each include at least one input port and at least one output port interconnecting the nodes in the FSM in a logical flow. In certain embodiments, the gateway node and the at least one question node alternate such that when two question nodes are defined to have a dependency relationship therebetween, the gateway node is located between the two question nodes in the logical flow of the FSM.

When an application does not exist for the category and topic at 430, the server provides an indication to the virtual assistant application that no suitable application for the query currently exists at 450 and provides an indication to one or more application developers that no suitable application for the query currently exists at 455. In this manner, application developers can be made aware of potential gaps in topics covered by the system and develop applications to address previously unanswerable questions.

The virtual assistant application then receives a response from the server at 460 and displays information pertaining to the response to the user at 465. For instance, the virtual assistant application may display an answer to the query, speak an answer to the query, display to the user that no answer could be found, etc. In the event that no answer was found, developer computing systems receive a notification that this was the case at 470 (e.g., via email).

Per the above, some embodiments provide a context-aware intelligent research assistant system that is implemented via a virtual assistant application running on a user computing system that receives human voice communications from a user (e.g., natural language queries) and transmits text recognized from the speech (e.g., via a speech recognition engine) to a server backend. In some embodiments, the identity of the user may be authenticated by analyzing patterns of the user's speech. The speech may initiate a user conversation session, and the session may remain active unless the user terminates the session or remains inactive for a certain time period threshold. In certain embodiments, the identity of the user is maintained in the session of the local browser and attached to each user query sent to the server. In this way, the server need not maintain dedicated sessions for the user, and thus may operate in an asynchronous mode instead of a synchronous mode.

The server backend analyzes the text, selects an appropriate application (or service) based on the text, prepares the parameters and calls an API for the selected service, receives a response from the service API, prepares an answer for the user based on an answer template, and returns the answer to the question to the virtual assistant application, which then provides the answer to the user. A registration process may be employed where application developers register their applications and inform the system which API will be invoked to answer a registered question under the application when asked by a user. In certain embodiments, developers may subsequently enhance and update the implementation of the corresponding API. In some embodiments, the associated API may be invoked to obtain query results and respond to users by completing the answer template after receiving a question and determining the requisite information.

In some embodiments, the questions that the context-aware intelligent research assistant system can handle are organized by categories and topics. In some embodiments, the server may provide an indication to the virtual assistant application that the question is not supported if no suitable application is found for providing the answer. In some embodiments, when multiple potential categories or topics exist, the user may be prompted to choose from multiple options. In some embodiments, the user chooses from menu options to navigate through the system, such as choosing a category or topic, and may return to a higher level of the menu. In certain embodiments, the user's question may be input as text via the computing system, the answer may be provided as text on a display of the computing system, or both. In some embodiments, the server backend may be a cloud-based system.

In some embodiments, the applications (or services) are implemented as directed networks that include nodes and edges. In certain embodiments, the nodes represent states. In some embodiments, the states include two types of nodes—question nodes and gateway nodes. Question nodes may represent questions that are supported by the system. Gateway nodes may represent applications that pertain to one or more questions. In some embodiments, the edges link two nodes representing a state transition from a starting node to an ending node. In some embodiments, the edges connect the nodes to one another via one or more input ports and one or more output ports. In certain embodiments, the application may return to the gateway node after one or more question nodes are accessed. In some embodiments, the state nodes and the question nodes alternate. In certain embodiments, a state node is included between two question nodes if the question nodes are defined to have a dependency relationship therebetween. In some embodiments, Petri net technology is applied to automatically validate the state transition design.

In some embodiments, for each question state, the syntactical format of the question may be provided such that the question should follow a format including several key components. In certain embodiments, a question must contain one or more required keyword phrases, and potentially one or more optional keyword phrases. In certain embodiments, each keyword term or phrase is defined as an application-related term or phrase. In some embodiments, a namespace used to delimitate the context of a conversation for different applications. In certain embodiments, terms in the user's question are appended with a prefix representing the gateway state for the respective application. Thus, terms under different contexts will be considered as different terms and will not conflict with one another.

In some embodiments, the context-aware intelligent research assistant system may refine a user's question by adding missing components based on the context of previous dialogue with that user. For example, the previous questions asked by the user (e.g., pertaining to fire detection) may be recorded with associated timestamps. Afterwards, if the user asks the question "Where?", the system may automatically add the missing components of time and location for the question. In certain embodiments, the applications (or services) are developed by experts to provide answers to various scientific research questions, potentially specialized for one or more scientific domains.

Figure 5:
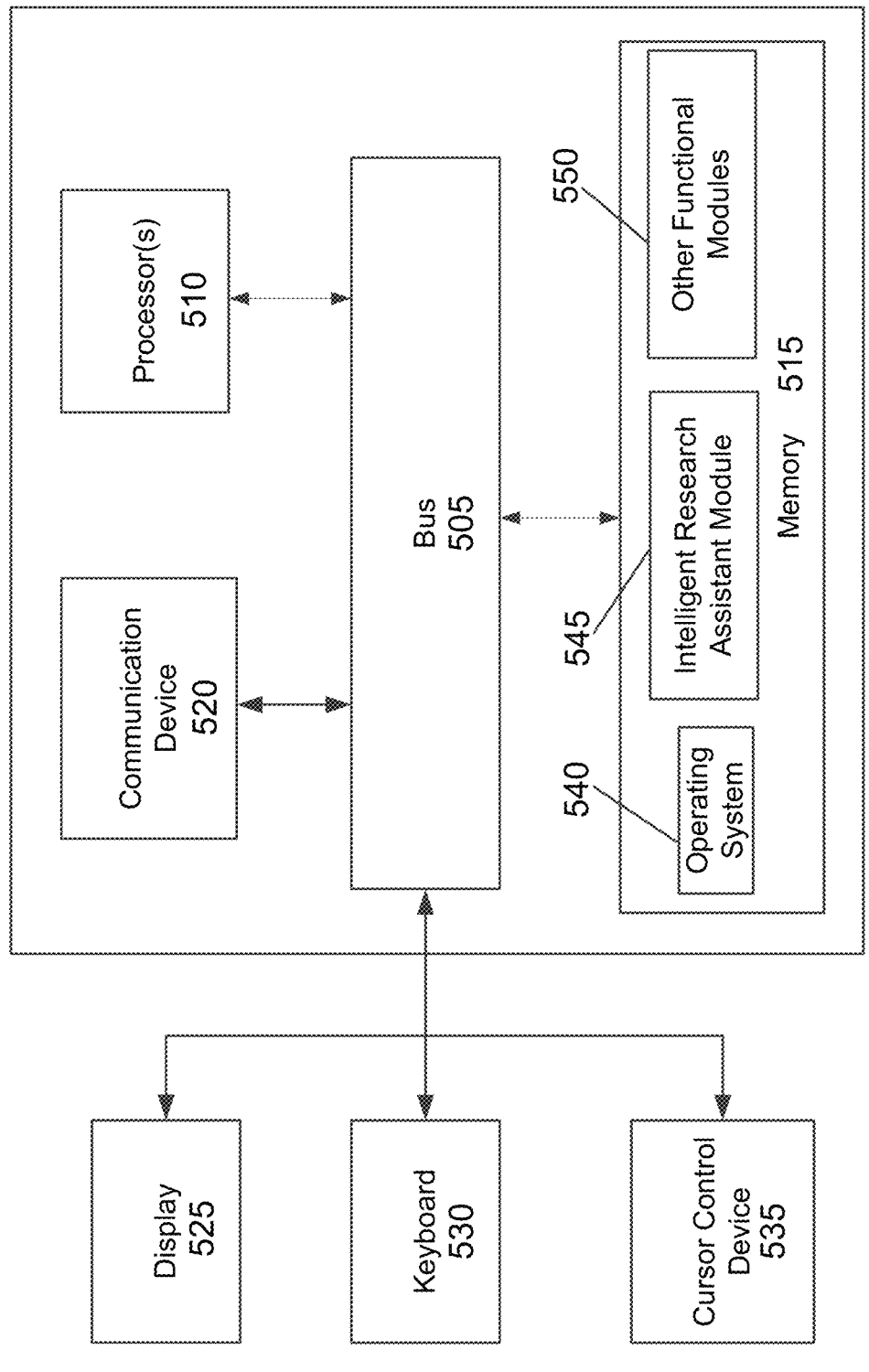
FIG. 5 is an architectural diagram illustrating a computing system configured to implement certain aspects of a context-aware intelligent research system, according to some embodiments of the present invention.

FIG. 5 is an architectural diagram illustrating a computing system 500 configured to implement certain aspects of a context-aware intelligent research system, according to some embodiments of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include an intelligent research assistant module 545 that is configured to perform all or part of the functionality of the processes and/or modules described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIG. 4 may be performed by a computer program, encoding instructions for the processor(s) to perform at least part of the process(es) described in FIG. 4, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIG. 4, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with some embodiments is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A community-driven, context-aware intelligent research assistant system, comprising:
   a server, the server having one or more processors and a memory accessible to the one or more processors, the memory storing instructions that, upon execution by the one or more processors, causes the one or more processors to:
   receive a query from a virtual assistant application running on a user computing system,
   determine a category and topic of the query,
   call an application programming interface (API) associated with an application appropriate for the category and topic, the application executing a finite state machine (FSM) logic to determine a context-aware answer to the query, and
   provide the determined context-aware answer to the virtual assistant application.

2. The system of claim 1, wherein the execution of the FSM logic comprises analyzing geospatial and temporal information.

3. The system of claim 1, wherein the application appropriate for the category and topic is selected from an extensible pool of applications developed by domain experts.

4. The system of claim 1, wherein
   the FSM comprises a gateway node and at least one question node,
   the gateway node is related to the application appropriate for the category and topic, and
   the at least one question node is related to a respective question addressed by the application appropriate for the category and topic.

5. The system of claim 4, wherein each question node comprises a developer-defined syntactical format comprising a plurality of components for the question.

6. The system of claim 5, wherein the server is configured to automatically add one or more missing components for the question based on earlier queries by the user.

7. The system of claim 4, wherein the at least one question node comprises an answer template for the respective question.

8. The system of claim 4, wherein the gateway node and the at least one question node each comprise at least one input port and at least one output port interconnecting the nodes in the FSM in a logical flow.

9. The system of claim 4, wherein the gateway node and the at least one question node alternate such that when two question nodes are defined to have a dependency relationship therebetween, the gateway node is located between the two question nodes in the logical flow of the FSM.

10. The system of claim 1, wherein the server is further configured to append a prefix to words of the query to provide a unique namespace delimiting context of the query.

11. A computer program embodied on a nontransitory computer-readable medium, the program configured to cause at least one processor to:
   receive a query from a virtual assistant application, the virtual assistant application running on a user computing system;
   determine a category and topic of the query;
   call an application programming interface (API) associated with an application appropriate for the category and topic, the application executing a finite state machine (FSM) logic to determine a context-aware answer to the query, and provide the determined context-aware answer to the virtual assistant application.

12. The computer program of claim 11, wherein the execution of the FSM logic comprises analyzing geospatial and temporal information.

13. The computer program of claim 11, wherein the FSM comprises a gateway node and at least one question node, the gateway node is related to the application appropriate for the category and topic, and the at least one question node is related to a question addressed by the application appropriate for the category and topic and comprises a developer-defined syntactical format comprising a plurality of components for the question.

14. The computer program of claim 13, wherein the program is further configured to cause the at least one processor to automatically add one or more missing components for the question based on earlier queries by the user.

15. The computer program of claim 13, wherein the at least one question node comprises an answer template for the respective question.

16. The computer program of claim 11, wherein the program is further configured to cause the at least one processor to append a prefix to words of the query to provide a unique namespace delimiting context of the query.

17. A computer-implemented method, comprising:

receiving, by a computing system, a query from a virtual assistant application;

determining, by the computing system, a category and topic of the query;

appending a prefix to words of the query, by the computing system, to provide a unique namespace delimiting context of the query;

calling, by the computing system, an application programming interface (API) associated with an application appropriate for the category and topic, the application executing a finite state machine (FSM) logic to determine a context-aware answer to the query; and providing, by the computing system, the determined context-aware answer to the virtual assistant application, wherein the FSM comprises a gateway node and at least one question node, the gateway node is related to the application appropriate for the category and topic, and the at least one question node is related to a question addressed by the application appropriate for the category and topic and comprises a developer-defined syntactical format comprising a plurality of components for the question and an answer template for the question.

18. The computer-implemented method of claim 17, further comprising:

automatically adding one or more missing components for the question based on earlier queries by a user.

* * * * *